(12) United States Patent
Wakabayashi et al.

(10) Patent No.: US 7,213,117 B2
(45) Date of Patent: May 1, 2007

(54) 1-CHIP MICROCOMPUTER HAVING CONTROLLED ACCESS TO A MEMORY AND IC CARD USING THE 1-CHIP MICROCOMPUTER

(75) Inventors: Masaki Wakabayashi, Nara (JP); Ryuichi Ogawa, Nara (JP); Kazuhiro Yaegawa, Yamatokoriyama (JP); Susumu Kurioka, Nara (JP); Kenji Ohno, Kyoto (JP); Tadao Takeda, Ebina (JP); Hiroki Sutou, Yokohama (JP); Masahiro Yoshizawa, Isehara (JP)

(73) Assignees: Sharp Kabushiki Kaisha, Osaka (JP); Nippon Telegraph and Telephone Corporation, Tokyo (JP)

( * ) Notice: Subject to any disclaimer, the term of this patent is extended or adjusted under 35 U.S.C. 154(b) by 498 days.

(21) Appl. No.: 09/805,199

(22) Filed: Mar. 14, 2001

(65) Prior Publication Data

US 2001/0027511 A1    Oct. 4, 2001

(30) Foreign Application Priority Data

Mar. 14, 2000  (JP)  ............................. 2000-071183

(51) Int. Cl.
  *G06F 12/14*  (2006.01)

(52) U.S. Cl. ...................... 711/163; 711/152; 710/200

(58) Field of Classification Search ................ 711/163, 711/152, 153, 164, 115; 713/200; 710/200
  See application file for complete search history.

(56) References Cited

U.S. PATENT DOCUMENTS 3,803,559 A * 4/1974 Bandoo et al. ............. 711/163

(Continued)

FOREIGN PATENT DOCUMENTS

EP      0735488 A1    10/1996

(Continued)

OTHER PUBLICATIONS

Free Online Dictionary of Computing, http://wombat.doc.ic.ac.uk/foldoc/foldoc.cgi?query=flag, May 2, 1998.*

(Continued)

*Primary Examiner*—Hong Kim
(74) *Attorney, Agent, or Firm*—Birch, Stewart, Kolasch & Birch, LLP

(57) ABSTRACT

A 1-chip microcomputer of the present invention has (a) a monitor flag for setting a flag indicating that a specified address space is accessed, (b) an access permission address range setting register, for setting an address range in which an access is permitted while the flag is set, (c) an access permission area detection circuit for judging whether the access is made within the address range thus set, (d) an access permission setting register, for setting whether or not an access with respect to an address other than the address range should be permitted, and (e) memory read-out control circuit and memory writing control circuit for controlling an access with respect to a nonvolatile memory based on a result thus judged and content set by the access permission setting register. With the arrangement, it is possible to provide a 1-chip microcomputer that maintains the security among application programs.

26 Claims, 8 Drawing Sheets

U.S. PATENT DOCUMENTS

| | | |
|---|---|---|
| 5,452,431 A | 9/1995 | Bournas |
| 5,890,189 A * | 3/1999 | Nozue et al. ............... 711/100 |
| 5,956,520 A * | 9/1999 | Kishi et al. .................. 712/39 |
| 5,991,858 A * | 11/1999 | Weinlander ................ 711/163 |
| 6,594,746 B2 * | 7/2003 | Rabeler ...................... 711/163 |

FOREIGN PATENT DOCUMENTS

| | | |
|---|---|---|
| EP | 1134959 A2 * | 9/2001 |
| JP | 1-96747 A | 4/1989 |
| JP | 1-180656 A | 7/1989 |
| JP | A855204 | 2/1996 |
| JP | 10-240623 A | 9/1998 |

OTHER PUBLICATIONS

Webster's 1913 Dictionary at hyperdictionary, http://www.hyperdictionary.com/search.aspx?define=judgment, 1913.*

Takahashi et al., "Efficient Kernel Support of Fine-Grained Protection Domains for Mobile Code," Distributed Computing Systems, 1999 Proceedings 19th IEEE Internatiional Conference, Austin, TX, USA May 31-Jun. 4, 1999, Los Alamitos, CA, USA, IEEE Comput. Soc. US, May 31, 1999, pp. 64-73.

Gareau, J., "Advanced Embedded x86 Programming: Protection and Segmentation," Embedded Systems programmin, Miller Freeman, USA, vol. 11, No. 5, May 1998, pp. 72-74, 76, 78, 80, 82, 84, 86.

* cited by examiner

1-CHIP MICROCOMPUTER HAVING CONTROLLED ACCESS TO A MEMORY AND IC CARD USING THE 1-CHIP MICROCOMPUTER

FIELD OF THE INVENTION

The present invention relates to a 1-chip microcomputer in which a plurality of application programs have been loaded (stored) in a program memory and relates to an IC card using such a 1-chip microcomputer, and particularly relates to a 1-chip microcomputer which limits the access with respect to the memory so as to improve the security for the data among the application programs and relates to an IC card using such a 1-chip microcomputer.

BACKGROUND OF THE INVENTION

In a 1-chip microcomputer in which a nonvolatile memory with large memory capacity is provided as a program memory, a plurality of application programs, suitable for a variety of usages, are stored in advance in the program memory, the respective application programs are selected for execution. A built-in memory in the 1-chip microcomputer is accessed by a CPU. Accordingly, any one of the programs operated under the same CPU can access to the data which fall within an accessible range of the CPU. In this case, when a plurality of application programs are loaded, one application program can access instruction codes and data of the other application program. As a result, it is most likely that the other application program or the data are altered and/or read out, thereby arising the problem that the security therefor is damaged.

In order to solve the foregoing problem, the Japanese unexamined patent publication No. 8-55204 (published on Feb. 27, 1996) discloses as follows. More specifically, the patent publication discloses the method in which a CPU is provided with members such as a program segment register, a program counter, and a register for accessing to the data on the memory, and in which the address to be executed and read/written is found based on the operations made by the members so as to limit the memory access.

An IC card in which the foregoing method for limiting the memory access is used, as shown in FIG. 8, is provided with a CPU 101, a ROM 102, a RAM 103, and an EEPROM 104. The structure and the functions of the CPU 101 allow to solve the foregoing problem.

As shown in FIG. 9, the CPU 101 is provided with (a) a program segment register (PSR) 201 for resetting only once a registered value after resetting the CPU 101, (b) an offset register (DR) 202 of data access use for accessing to the data on the memory, (c) an address addition means 205 for generating an execution address in response to a program counter (PC) 203 and the program segment register 201, (d) an address addition means 204 for generating a writing address in response to the data read out from the offset register 202 and the program segment register 201, and (f) an address multiplication means 206 for generating an offset address that is commonly used for generating of the execution address, generating of the data reading address, and the data writing address.

Note that the program segment register 201 is used for storing ID (Identification) number of a target application program that has been received from outside. The offset register 202 of data access use is used for storing the offset value for giving the offset to the reading and writing address.

The program counter 203 points to the address of the execution instruction of the program. For example, when it is assumed that the ID number of the target application program that has been received from outside is "2", the numeral value "2" is stored in the program segment register 201. When the address to be executed is set to 1000 times as many as the program segment register 201 as the absolute offset value, the program execution address is jumped to address of (2×1000). Thereafter, the address to be executed is specified based on the value of the program segment register 201 and the pointing value of the program counter 203 so that the execution address becomes equal to an address of (2×1000+the pointing value of the program counter 203).

The respective reading and writing addresses of the data are found based on the registered values of the program segment register 201 and the offset register 202 of data access use so that an address of (2×1000+the registered value of the offset register 202 of data access use) is specified to be executed.

Thus, while the application program specified by the ID number of a target application program that has been stored in the program segment register 201, it becomes only possible to access to (a) the address range in which such a target application program has been stored and to (b) RAMS.

Accordingly, in the case where a plurality of application programs are loaded in the program memory, it is not be allowed that one of the application programs accesses to the instruction codes and data of the other application programs, thereby maintaining the security.

However, according to the foregoing conventional method for limiting the address, since it is limited once to set the program segment register, it is allowed to execute only one of the application programs after the CPU is reset. Thus, it is necessary to reset the CPU again in order to consecutively execute the other application programs. In addition, there arises the problem that it is not possible to communicate among the application programs. Thus, the foregoing conventional method has the above problems concerning the convenience.

For example, in the case of an IC card in accordance with the foregoing conventional method in which a plurality of application programs are loaded, the execution of the other application program can not be made until the IC card is separated from reader and writer in an IC card system, i.e., until the power source is cut off.

Thus, in the case of intending to execute a series of plural application programs, every time one of the application programs finishes executing, it is necessary to load again the IC card after separating the IC card from the reader and writer. Therefore, the IC card should repeat the initialization proceeding for every loading of the IC card. This arises the problem that it takes a longer time to carry out such a series of proceedings and the problem that it is necessary to load and unload the IC card so often.

When returning to an original address (a return address) after executing a subroutine call in the currently executing application program, such a return address is temporarily stored in RAM in general. In the circumstances, when the return address is rewritten to another address by accident or by intention, it is most likely that the application program goes out of order or it is most likely to cause erroneous access with respect to the other application program. In any way, it is most likely that the CPU goes out of order. The foregoing conventional method for limiting the address, however, takes no appropriate steps against such a case.

SUMMARY OF THE INVENTION

The present invention is made in view of the foregoing problems, and it is an object of the present invention to provide a 1-chip microcomputer in which a plurality of application programs are stored and it is not possible for one of the application programs to access to instruction codes and data of the other application programs so as to maintain the security.

It is another object of the present invention to provide a 1-chip microcomputer in which a plurality of application programs can be consecutively executed without operations such as a reset operation so as to improve the convenience.

It is a further object of the present invention to provide a 1-chip microcomputer in which even when one application program accesses with respect to the other application program by accident or by intention, it is possible to continue the proceedings with the access limiting function being effective and without causing that the CPU goes out of order.

In order to achieve the foregoing object, a 1-chip microcomputer in accordance with the present invention is provided with (1) access permission address range setting means, for setting an address range in which an access is permitted, that is capable of being set when a specified address space is executed (accessed), (2) judging means for judging whether or not an access is carried out within the address range thus set during execution of a software, (3) access permission setting means, for setting whether or not an access with respect to an address other than the address range should be permitted, that is capable of being set when the specified address space is executed (accessed), (4) and control means for controlling an access with respect to a memory based on a result of the judging means and content setted by the access permission setting means.

With the 1-chip microcomputer, when a software which has been stored in the specifed address space is executed, it becomes possible to set the access permission address range setting means and the access permission setting means, respectively.

When the software which has been stored in the specified address space is not executed, it is not possible to set the access permission address range setting means and the access permission setting means, respectively, even when setting from the specified address space.

While the software that has been stored in the specified address space is executed, an address range can be set from the specified address space through the access permission address range setting means. In this case, the judging means judges whether or not the address within the address range thus set is accessed during the execution of the software. In contrast, in the case where the software stored in the specified address space is not executed, even when the data is inputted to the access permission address range setting means from the specified address space, the data will never be written into the access permission address range setting means.

In the mean time, when the software that has been stored in the specified address space is executed, it can be set whether or not the access with respect to the address other than the address range should be permitted from the specified address space through the access permission setting means. Accordingly, in the case where the software that has been stored in the specified address space is not executed, it is not possible for the data to be written into the access permission setting means, even if the data is inputted to the access permission setting means from the specified address space.

Based on the judgement result and the content set by the access permission setting means, the access with respect to the memory is controlled by the control means. More specifically, when the address range is set but the access is not permitted with respect to the address other than the address range, it is possible to access only to the address within the address range, but is not possible to access to the address other than the address range.

Since the access to the memory is thus controlled, it can be avoided that the address space in which the other programs are stored are adversely affected by the currently executing program. Further, since it is possible to set the access permission setting means and the address range setting means only from the specified address space, the respective setting means are not affected by the application program. Namely, the access permission setting means and the address range setting means that can be set from the specified address space will never also be affected.

When the address range is set and the access to the address other than the address range is permitted, it is possible to access even to the address other than the address range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

DESCRIPTION OF THE EMBODIMENTS

The following description deals with one embodiment of the present invention with reference to FIGS. 1 through 7.

The present embodiment deals with the case where the present invention is adapted to a 1-chip microcomputer of IC card use in which a nonvolatile memory is provided.

Figure 2:
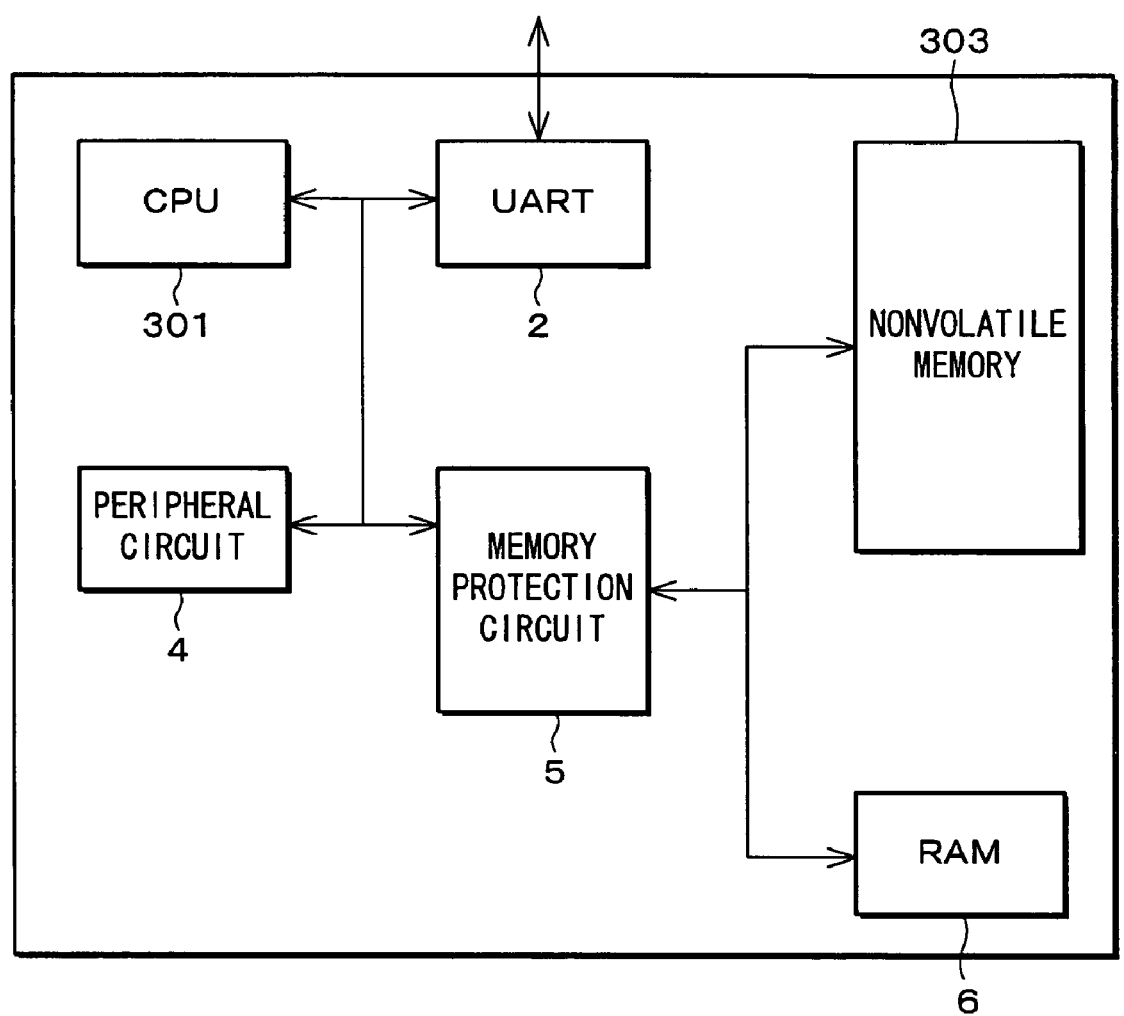
FIG. 2 is a block diagram showing a concrete example of the 1-chip microcomputer.

FIG. 2 is a block diagram showing a 1-chip microcomputer for use in an IC card. The 1-chip microcomputer is provided with a CPU for executing an application program as well as a system program, a nonvolatile memory 303 in which the application programs and the system program (for example, a rewritable memory such as a flash memory or an EEPROM), a RAM 6 of the CPU 301's working use, a memory protection circuit 5, a UART 2 for communicating with external devices, and a peripheral circuit 4 such as a timer. These blocks (circuits) are appropriately connected by (a) address lines and data lines which are inputted or outputted to or from the CPU, (b) control lines for reading out or writing to the data and for activating the block, and other lines.

Figure 1:
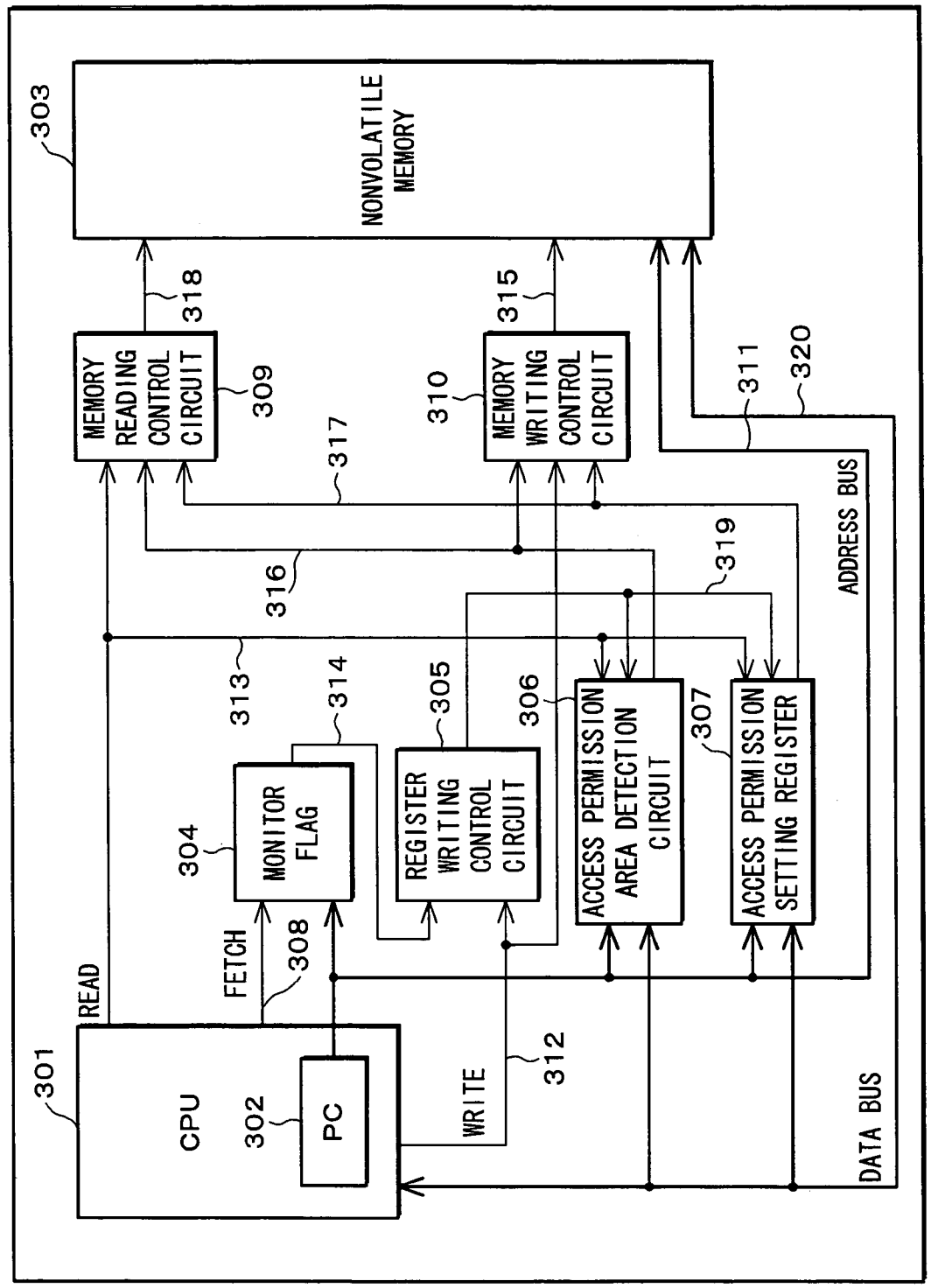
FIG. 1 is a block diagram showing a structure of a 1-chip microcomputer of the present invention.

FIG. 1 is a block diagram showing in detail the CPU 301, the memory protection circuit 5, and the nonvolatile memory 303 shown in the block diagram of FIG. 2.

The 1-chip microcomputer is provided with the CPU 301, a program counter (PC) 302 which is contained in the CPU 301, the nonvolatile memory 303, a monitor flag 304, an access permission area detection circuit 306 including an access permission address range setting register (later described), an access permission setting register 307, a register writing control circuit 305 for limiting of generation of a writing signal with respect to the access permission address range setting register and the access permission setting register 307, a memory reading control circuit 309 for limiting of generation of a reading signal with respect to the nonvolatile memory 303, and a memory writing control circuit 310 for limiting of generation of a writing signal with respect to the nonvolatile memory 303.

To the monitor flag 304 are sent an address bus signal 311 outputted from the CPU 301 and an instruction read out signal 308 (FETCH) indicative of the first cycle of the instruction. The monitor flag 304 judges whether or not the CPU 301 executes the system software such as an operating system that has been stored in a specified address space of the nonvolatile memory 303. When the specified address space is accessed, the monitor flag 304 outputs a high level of binary logic (hereinafter referred to as "1"). In contrast, when an address space other than the specified address space is accessed, the monitor flag 304 outputs a low level of binary logic (hereinafter referred to as "0").

To the register writing control circuit 305 are sent a writing reference signal 312 (WRITE) outputted from the CPU 301 and a monitor flag output signal 314 outputted from the monitor flag 304. Note that the writing reference signal 312 is outputted when the CPU 301 accesses to a built-in register or a built-in memory.

The register writing control circuit 305 controls whether or not the writing reference signal 312 should be transmitted to the access permission address range setting register in the access permission area detection circuit 306 and the access permission setting register 307.

When the monitor flag 304 outputs "1", i.e., when the writing operation occurs in the above-mentioned specified address space, the writing reference signal 312 is transmitted to the access permission address range setting register (not shown) in the access permission area detection circuit 306 and the access permission setting register 307, respectively. This allows to write to the access permission address range setting register (not shown) in the access permission area detection circuit 306 and the access permission setting register 307, respectively.

In contrast, when the monitor flag 304 outputs "0", i.e., when the writing operation occurs in an address space other than the above-mentioned specified address space, the writing reference signal 312 is neither transmitted to the access permission address range setting register in the access permission area detection circuit 306 nor to the access permission setting register 307. Thus, it is forbidden to write to the access permission address range setting register in the access permission area detection circuit 306 and the access permission setting register 307, respectively.

Figure 3:
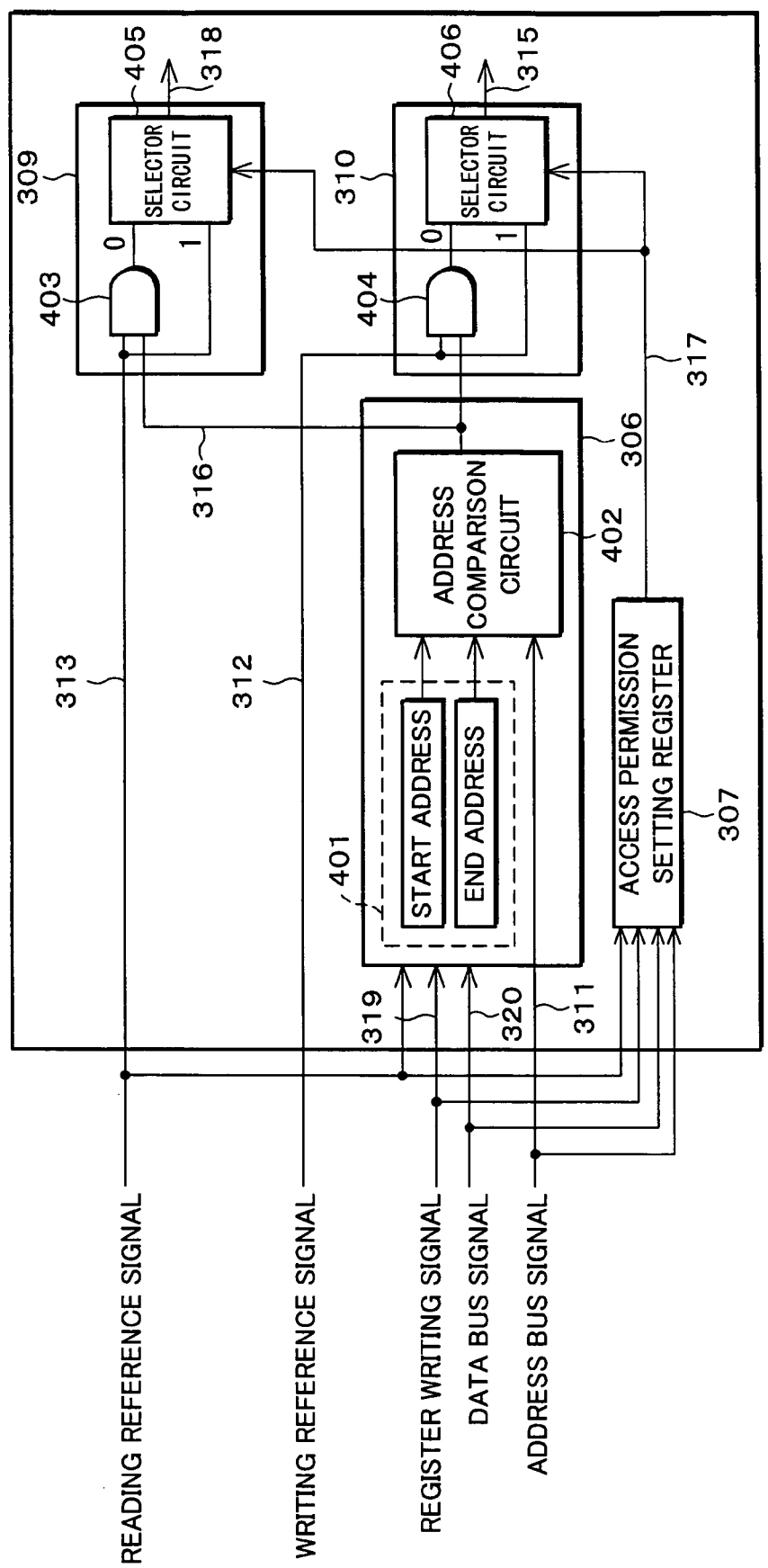
FIG. 3 is a block diagram showing structures of an access permission area detection circuit and a periphery of an access control circuit.

FIG. 3 is a block diagram further showing in detail the operations of the access permission area detection circuit 306, the access permission setting register 307, the memory reading control circuit 309, and the memory writing control circuit 310.

To the access permission area detection circuit 306 are sent the address bus signal 311 outputted from the CPU 301, a data bus signal 320, a reading reference signal 313 (READ) outputted from the CPU 301, a register writing signal 319 outputted from the register writing control circuit 305.

The access permission area detection circuit 306 is composed of an access permission address range setting register 401 for releasing the limiting of the reading and writing with respect to the memory, and an address comparison circuit 402. The address area (access permission address range) is set by a register that is provided for storing a start address and an end address of the address area. Such a register is written by the register writing signal 319. Note that the writing can be made only from the specified address space by the monitor flag 304.

In the access permission area detection circuit 306 prior to execution of an application program of an IC card, the operating system sets the access permission address area setting register so as to have the start and end addresses of the area in which the application program is stored. During the execution of the application program, the address comparison circuit 402 compares the address bus signal 311 outputted from the CPU 301 with the value registered by the access permission address range setting register 401. While the CPU 301 accesses to the address range thus set, the address comparison circuit 402 outputs "1" as an access permission address area output signal 316. Similarly, while the CPU 301 accesses to the area in which an application program other than the currently executed application program is stored, the address comparison circuit 402 outputs "0" as the access permission address area output signal 316.

To the access permission setting register 307 are sent the address bus signal 311, the data bus signal 320, a reading reference signal 313 outputted from the CPU 301, and the register writing signal 319 outputted from the register writing control circuit 305.

The access permission setting register 307 is provided for setting whether or not the access for reading out or writing in should be permitted to the application program area other than the address range set by the access permission address range setting register 401 in the access permission area detection circuit 306. The access permission setting register 307 is written by the register writing signal 319. Note that the writing can be made only from the specified address space by the monitor flag 304.

Prior to execution of an application program of an IC card, when the operating system sets the access permission setting register 307 so as to have "0", an access permission signal 317 of "0" is outputted. When the operating system sets the access permission setting register 307 so as to have "1", an access permission signal 317 of "1" is outputted.

The access permission setting register 307 is provided for setting whether or not the access for reading out or writing in should be permitted to the application program area other than the address range set by the access permission address range setting register 401 in the access permission area detection circuit 306.

When the operating system sets the access permission setting register 307 so as to have "0", it becomes possible to read and write only within the application program address range that has been set by the access permission address range setting register 401 in the access permission area detection circuit 306. When the operating system sets the access permission setting register 307 so as to have "1", it becomes possible to read and write with respect to all the application program memory area.

To the memory read-out control circuit 309 are sent the reading reference signal 313 outputted from the CPU 301, the access permission address area output signal 316 outputted from the address comparison circuit 402, and the access permission signal 317. The memory read-out control circuit 309 is composed of an AND circuit 403 and a selector circuit 405. The memory read-out control circuit 309 controls whether or not the reading reference signal 313 should be transmitted to the nonvolatile memory 303.

When the access permission signal 317 is "0", the selector circuit 405 selects a signal, that is obtained by an AND operation of the AND circuit 403 to which the reading reference signal 313 and the access permission address area output signal 316 are sent, and sents it to the nonvolatile memory 303 as a reading signal 318. Namely, the reading signal 318 is not outputted when the area is specified outside the memory area set by the access permission area detection circuit 306. When the access permission signal 317 is "1", the selector circuit 405 selects the reading reference signal 313 so as to supply the reading signal 318 to the nonvolatile memory 303. Namely, the read-out operation has no limit within the memory area of the application program.

To the memory writing control circuit 310 are sent the writing reference signal 312 outputted from the CPU 301, the access permission address area output signal 316, and the access permission signal 317. The memory writing control circuit 310 is composed of an AND circuit 404 and a selector circuit 406. The memory writing control circuit 310 controls whether or not the writing reference signal 312 should be transmitted to the nonvolatile memory 303.

When the access permission signal 317 is "0", the selector circuit 406 selects a signal, that is obtained by an AND operation of the AND circuit 404 to which the writing reference signal 312 and the access permission address area output signal 316 are sent, and sents it to the nonvolatile memory 303 as a writing signal 315. Namely, the writing signal 315 is not outputted when the area is specified other than the memory area (outside the address range) set by the access permission area detection circuit 306. When the access permission signal 317 is "1", the selector circuit 406 selects the writing reference signal 312 so as to send the reading signal 318 to the nonvolatile memory 303. Namely, the writing operation has no limit within the memory area of the application program.

Figure 4:
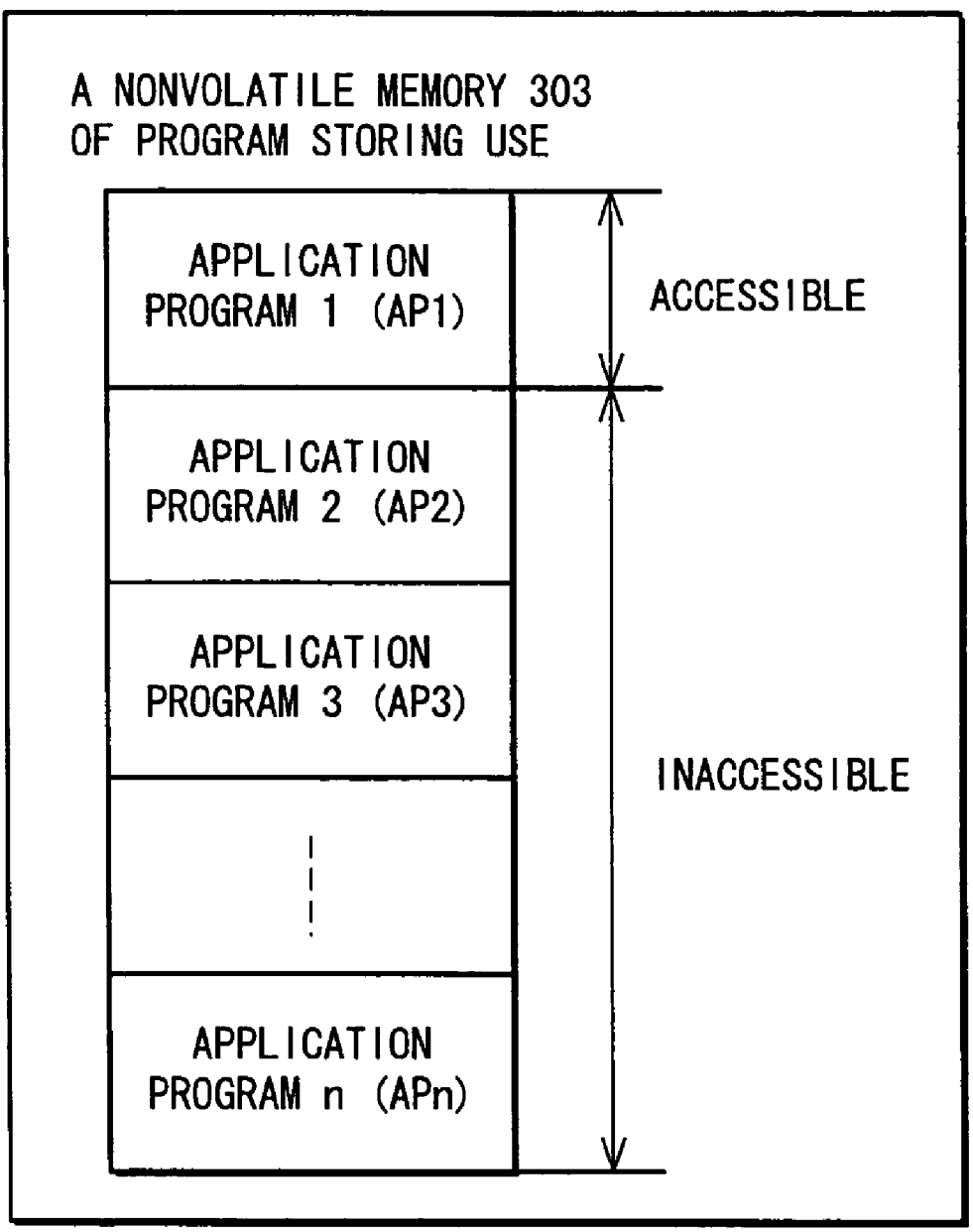
FIG. 4 is a memory map diagram of a memory of an application program use of a 1-chip microcomputer in accordance with the present invention.

FIG. 4 is a memory map diagram of the nonvolatile memory 303 of an application program storing use in accordance with the present embodiment. Application programs AP1 through APn (hereinafter merely referred to as AP1 through APn) are stored in the nonvolatile memory 303. For example, when the CPU 301 executes AP1 under the operating system after (a) setting a start address and an end address of AP1 with respect to the access permission address range setting register 401 of the access permission area detection circuit 306 and (b) setting the access permission setting register 307 to "0", it is not possible to access to the memory areas of the respective application programs other than that of AP1.

Figure 5:
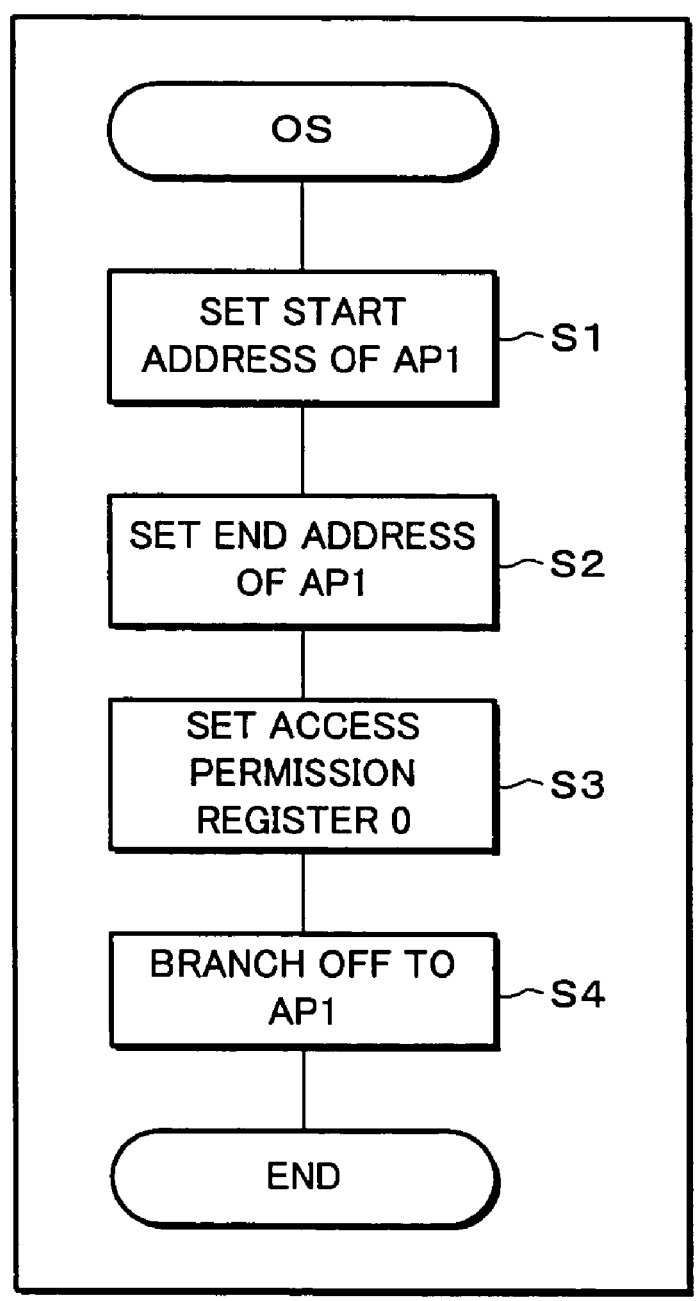
FIG. 5 is a flow chart showing operations of the application program during a branch off thereof.

FIG. 5 is a flow chart showing the proceedings carried out by the operating system before the CPU 301 executes AP1. First, in steps S1 and S2, the start and end addresses of AP1 are set to the access permission address range setting register 401 of the access permission area detection circuit 306.

Next, in step S3, "0" is set to the access permission setting register 307. In step S4, an instruction for branching off to AP1 is executed, thereafter AP1 starts to be executed. In the case where the other application programs are executed after the execution of AP1 is over, the operations of the steps S1 through S4 are repeated. With the operations, it is possible that the respective application programs that are different from each other are consecutively executed without affecting the other application programs.

Further, in the case where (a) an application program is newly added to the application program memory by the operating system or (b) the existing application program is replaced with a new application program, it is possible to execute the foregoing steps by obtaining a start address and an end address of such a new application program.

Figure 6:
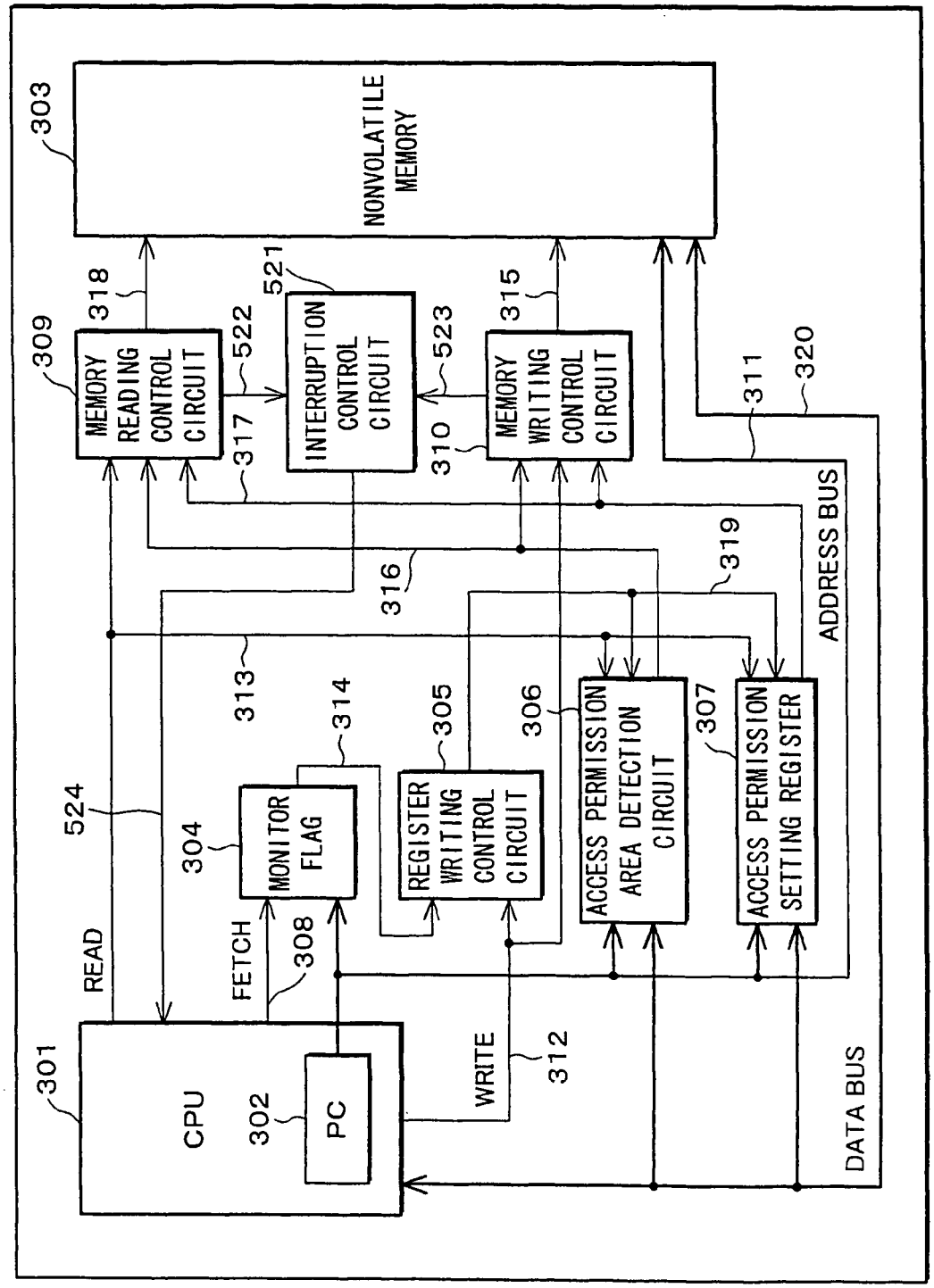
FIG. 6 is another block diagram showing a structure of a 1-chip microcomputer of the present invention.

FIG. 6 is a block diagram showing in detail the CPU 301, the memory protection circuit 5, and the nonvolatile memory 303 of a 1-chip microcomputer in accordance with the present invention.

The 1-chip microcomputer is provided with a CPU 301 the program counter 302 included in the CPU 301, a nonvolatile memory 303, a monitor flag 304, an access permission setting register 307, a register writing control circuit 305 for limiting the generation of the writing signal to an access permission address range setting register 401 and an access permission setting register 307, a memory reading control circuit 309 for limiting the generation of the reading signal to the memory, a memory writing control circuit 310 for limiting the generation of the writing signal to the memory, and an interrupting control circuit 521.

The operations of the blocks other than the memory reading control circuit 309, the memory writing control circuit 310, and the interrupting control circuit 521 of FIG. 6 are the same as those of the block diagram shown in FIG. 1.

The memory reading control circuit 309 has a further function that outputs a memory reading violation detection signal 522 indicative of the fact that the reading operation that has not been permitted is executed with regard to the nonvolatile memory 303. The memory writing control circuit 310 has a further function that outputs a memory writing violation detection signal 523 indicative of the fact that the writing operation that has not been permitted is executed with regard to the nonvolatile memory 303.

When the interrupting control circuit 521 receives the memory reading violation detection signal 522 outputted from the memory read-out control circuit 309 and the memory writing violation detection signal 523 outputted from the memory writing control circuit 310, the interrupting control circuit 521 sends to the CPU 301 an interruption request signal 524.

In the case where the access permission signal 317 of "0" is sent to the memory reading control circuit 309, i.e., in the case where it is set so as to prohibit from reading and writing with respect to the nonvolatile memory 303, when the CPU 301 carries out the reading operation with respect to the address range other than that permitted by the access permission area detection circuit 306, the memory reading violation detection signal 522 is activated (becomes active).

In the case where the access permission signal 317 of "0" is sent to the memory writing control circuit 310, i.e., in the case where it is set so as to prohibit from reading and writing with respect to the nonvolatile memory 303, when the CPU 301 carries out the writing operation with respect to the address range other than that permitted by the access permission area detection circuit 306, the memory writing violation detection signal 523 is activated.

The respective memory access violation detection signals are sent to the interrupting control circuit 521 which transmits the interruption request signal 524 to the CPU 301. Accordingly, the CPU 301 can execute the interruption proceedings when the currently executing application program dishonestly accesses to the memory area other than its program memory area.

It is not simultaneously made to read and write with respect to the nonvolatile memory 303. Accordingly, the interrupting control circuit 521 may be constituted by an OR circuit to which the memory reading violation detection signal 522 and the memory writing violation detection signal 523 are inputted, and a well known timing control circuit (not shown) for controlling the timing in accordance with what the specifications of the CPU 301 require. The interrupting control circuit 521 generates and outputs the interruption request signal 524.

Figure 7:
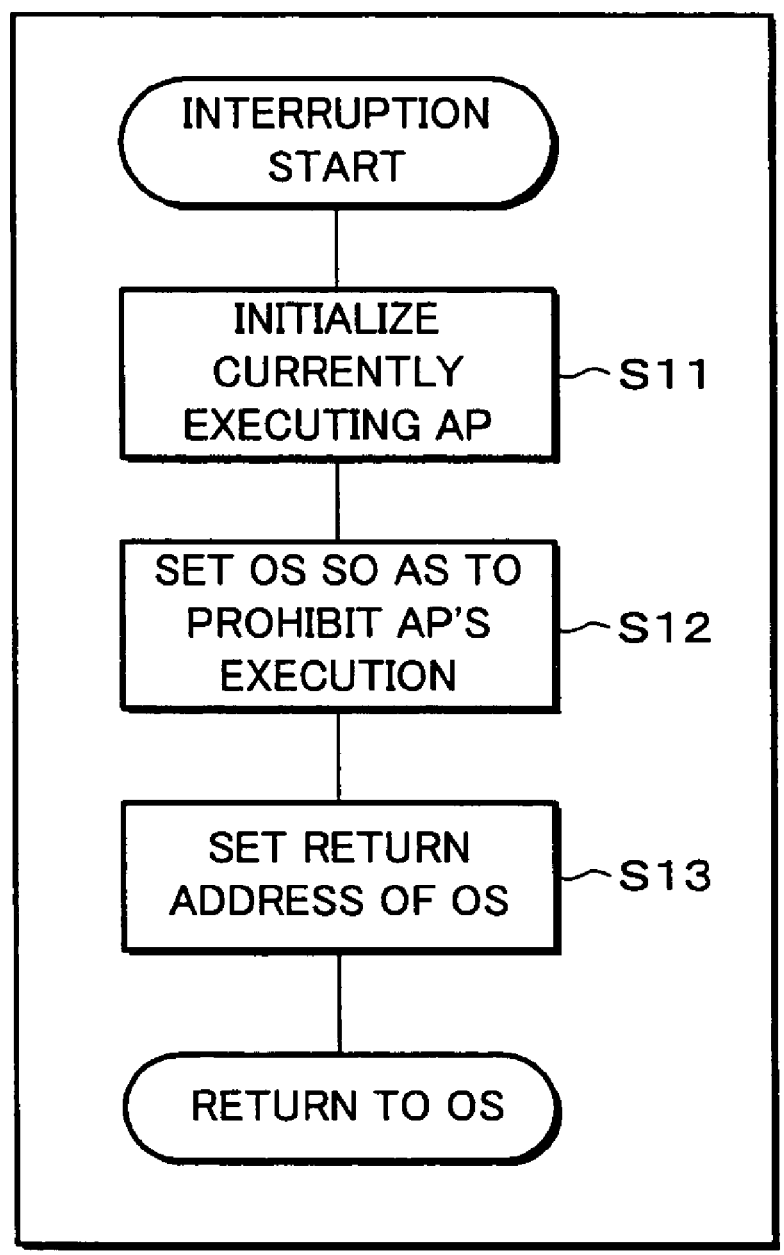
FIG. 7 is a flow chart showing an interrupting operation during memory dishonest (undesired) access.
Figure 8:
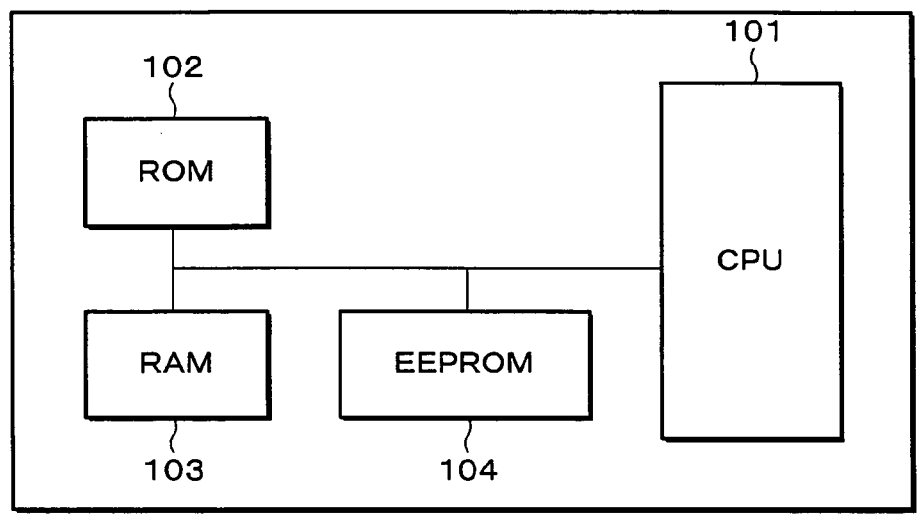
FIG. 8 is a block diagram showing a structure of a conventional 1-chip microcomputer.
Figure 9:
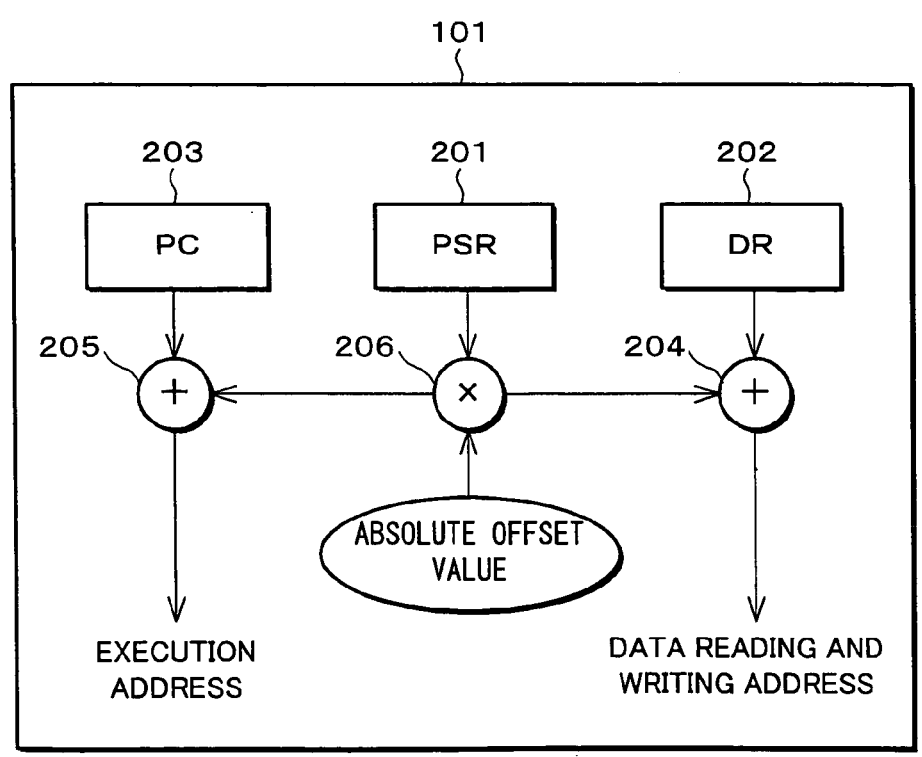
FIG. 9 is an explanatory diagram showing structure functions of CPU.

FIG. 7 is a flow chart showing one example of the interruption proceedings that are managed by the operating system and the CPU 301 when the interruption request signal 524 is generated in response to the detection of the foregoing memory access violation.

When the interruption request signal 524 is sent to the CPU 301, the interruption proceeding program starts. First, in step S11, the initialization with respect to such as the working area used by the application program (AP) that has made the access violation. Next, in step S12, the setting is carried out with respect to the flag or the register that controls the prohibition of execution prepared in the area that has been managed by the operating system so that the application program (AP) that has made the access violation is not executed again. Thus, it is prohibited that such an application program is executed again. Then, in step S13, the return address to the operating system is set, and the interruption proceedings are over, thereafter the controlling is handed over to the operating system.

Thus, even when the access violation happened by the application program, the CPU 301 can continue the proceedings without going out of order. When the flag or the register is once set in step S12, it is not occurred that the application program that has made the access violation is executed again afterwards. In other words, when it is confirmed that the flag or register is set, such an application program is not executed again.

By mounting the foregoing 1-chip microcomputer on an IC card (not shown), a plurality of application programs can be stored in the nonvolatile memory 303, and the respective application programs can be dynamically exchanged without resetting the system unlike the previously described conventional technique. Accordingly, it is possible to use such an IC card for the multipurpose while the IC card maintains to be loaded to the reader and writer. Further, the interference between the application programs and between the data can be avoided, it is possible to maintain the security such as the prohibition from dishonestly access to an application program or the protection of the data. This is suitable to an IC card that stores the confidential data such as the private information.

The foregoing description deals with the case where a variety of registers and a variety of flags are used. However, the present invention is not limited to this. For example, memory means that has similar functions may be substituted for them.

A 1-chip microcomputer in accordance with the present invention, as has been described above, is provided with a memory of program use and a memory of working use as built-in memories, and is further provided with a CPU having a program counter pointing to an address for an execution instruction of a program, a monitor flag indicating that a specified address space is accessed, a register which is capable of setting only from the specified address space and sets the memory so as to be permitted to access for reading and writing, a register for setting an address range in which the access is permitted, and a control circuit for controlling a reading signal and a writing signal that are sent to the built-in memory.

With the arrangement, it is not possible to access to the area other than the area, of the memories of the application program storing use, in which a currently executing application program is stored. Accordingly, it can be avoided for the area in which the other application programs are stored to be adversely affected. In other words, the currently executing application program does not adversely affect the area in which the other application programs are stored. Further, the setting with respect to the access permission register and the address range setting register can be made only from the specified area in which a system program (system software) such as an operating system is stored. Accordingly, these registers are not be affected by the application programs. Namely, the access permission register and the access range setting the register that are accessible only from the specified address space are not also affected.

It is preferable that the 1-chip microcomputer is further provided with means for setting data from the specified area to the access permission register and the access permission address range setting register. In such a case, before the controlling is handed over from the operating system to the application program, it is possible to set the address range that is accessible, thereby avoiding that the currently executing application program affects the other application programs.

It is preferable that the 1-chip microcomputer is further provided with means for generating an interruption request signal to the CPU when a currently executing application program accesses to a memory other than the memory in which such a currently executing application program has been stored. In such a case, when a dishonest access is made by an application program, the CPU can detect such dishonest access as an interruption request signal. Accordingly, it can be avoided that the CPU or the application program goes out of order before it happens.

It is preferable that the 1-chip microcomputer is arranged so as to build in an interruption proceeding program for preventing the CPU or the application program from going out of order when a currently executing application program accesses to a memory other than the memory in which such a currently executing application program has been stored. In such a case, when a dishonest access is made by an application program, the interruption proceeding program is executed (for example, the interruption proceeding program causes the controlling to be handed over to the system program or the operating system). Thus, it can be avoided that the CPU or the application program goes out of order.

It is preferable that the memory (program memory) for storing the programs of the 1-chip microcomputer is a—nonvolatile memory, that is rewritalbe, such as a flash memory or an EEPROM. In such a case, it is possible to execute the program without affecting the existing application program, even when an application program is later added or rewritten.

It is preferable that the 1-chip microcomputer is further provided with a flag or register for controlling so as to prohibit the program that carries out an access beyond the access limit from being executed, the flag or register being provided in an area managed by the system program or the operating system. In such a case, it is possible to execute the program without affecting the existing application program, even when an application program is later added or rewritten. Once a program dishonestly accesses, such a program is prohibited from being executed afterwards. This ensures that the CPU continues to proceed without going out of order.

It is preferable that the memory for storing the programs of the 1-chip microcomputer is a nonvolatile memory, that is rewritalbe, such as a flash memory or an EEPROM. In such a case, it is possible to execute the program without affecting the existing application program, even when an application program is later added or rewritten.

The above-mentioned 1-chip microcomputers are suitable for use in an IC card. In this case, according to an IC card in which a plurality of application programs are built in, it is possible to maintain the security among the application programs. It is also possible to realize an IC card in which a plurality of programs are stored and to dynamically exchange one with another without resetting the respective programs. Accordingly, it is possible to use such an IC card for multipurpose while the IC card is kept being loaded in the reader and writer. In addition, since it is possible to prevent the programs and the data from interfering with each other, it is possible to maintain the security for such as the prohibition of dishonest access by a program and the protection of the data. Accordingly, the above-mentioned 1-chip microcomputers are suitable for use in an IC card in which confidential data such as the private information are stored.

A 1-chip microcomputer in accordance with the present invention is provided with (1) access permission address range setting means, for setting an address range in which an access is permitted, that is capable of being set when a specified address space is executed (accessed), (2) judging means for judging whether or not an access is carried out within the address range thus set during execution of a software, (3) access permission setting means, for setting whether or not an access with respect to an address other than the address range should be permitted, that is capable of being set when the specified address space is executed (accessed), (4) and control means for controlling an access with respect to a memory based on a result of the judging means and content set by the access permission setting means.

With the 1-chip microcomputer, when a software which has been stored in the specified address space is executed, it becomes possible to set the access permission address range setting means and the access permission setting means, respectively.

When the software which has been stored in the specified address space is not executed, it is not possible to set the access permission address range setting means and the access permission setting means, respectively, even when setting from the specified address space.

While the software that has been stored in the specified address space is executed, an address range can be set from the specified address space through the access permission address range setting means. In this case, the judging means judges whether or not the address within the address range thus set is accessed during the execution of the software. In contrast, in the case where the software stored in the specified address space is not executed, even when the data is inputted to the access permission address range setting means from the specified address space, the data will never be written into the access permission address range setting means.

In the mean time, when the software that has been stored in the specified address space is executed, it can be set whether or not the access with respect to the address other than the address range should be permitted from the specified address space through the access permission setting means. Accordingly, in the case where the software that has been stored in the specified address space is not executed, it is not possible for the data to be written into the access permission setting means, even if the data is inputted to the access permission setting means from the specified address space.

Based on the judgment result and the content set by the access permission setting means, the access with respect to the memory is controlled by the control means. More specifically, when the address range is set but the access is not permitted with respect to the address other than the address range, it is possible to access only to the address within the address range, but is not possible to access to the address other than the address range.

Since the access to the memory is thus controlled, it can be avoided that the address space in which the other programs are stored are adversely affected by the currently executing program. Further, since it is possible to set the access permission setting means and the address range setting means only from the specified address space, the respective setting means are not affected by the application program. Namely, the access permission setting means and the address range setting means that can be set only from the specified address space will never also be affected.

When the address range is set and the access to the address other than the address range is permitted, it is possible to access even to the address other than the address range.

Another 1-chip microcomputer in accordance with the present invention is provided with (1) a monitor flag for setting a flag indicating that a specified address space is accessed (executed), (2) an access permission address range setting register, for setting an address range in which an access is permitted, that is capable of being set while the flag is set, (3) judging means for judging whether or not an access is carried out within the address range thus set during execution of a software, (4) an access permission setting register, for setting whether or not an access with respect to an address other than the address range should be permitted, that is capable of being set while the flag is set, (5) and control means for controlling an access with respect to a memory based on a result of the judging means and content set by the access permission setting register.

With the 1-chip microcomputer, when a software which has been stored in the specified address space is executed, a flag is set by the monitor flag. While the flag is set, it is possible to set the access permission address range setting register and the access permission setting register, respectively.

While the flag is not set, the software which has been stored in the specified address space is not executed. Thus, the monitor flag does not set the flag. Accordingly, it is not possible to set the access permission address range setting register and the access permission setting register, respectively, even when setting from the specified address space.

While the flag is set, an address range can be set from the specified address space through the access permission address range setting register. In this case, the judging means judges whether or not the address within the address range thus set is accessed during the execution of the software. In contrast, in the case where the software stored in the specified address space is not executed, even when the data is inputted to the access permission address range setting register from the specified address space, the data will never be written into the access permission address range setting register.

In the mean time, while the flag is set, it can be set whether or not the access with respect to the address other than the address range from the specified address space through the access permission setting register. Accordingly, in the case where the flag is not set, it is not possible for the data to be written into the access permission setting register, even if the data is inputted to the access permission setting register from the specified address space.

Based on the judgment result and the content set by the access permission setting register, the access with respect to the memory is controlled by the control means. More specifically, when the address range is set but the access is not permitted with respect to the address other than the address range, it is possible to access to the address within the address range but is not possible to access to the address other than the address range.

Since the access to the memory is thus controlled, it can be avoided that the address space in which the other programs are stored from are adversely affected by the currently executing program. Further, since it is possible to set the access permission setting register and the address range setting register only from the specified address space, the respective setting registers are not affected by the application program. Namely, the access permission setting register and the address range setting register that can be set from the specified address space will never also be affected.

Note that when the address range is set and the access to the address other than the address range is permitted, it is possible to access even to the address other than the address range.

It is preferable in the 1-chip microcomputer that a system software is stored in the specified address space, and the system software sets (a) the access permission address range setting register so as to have an address range in which a next program to be executed is stored prior to execution of the next program and (b) the access permission register so as not to permit the access with respect to the address other than the address range.

In such a case, prior to execution of the next program, the system software sets the access permission address range setting register so as to have the address range in which the program to be executed next is stored. Namely, the currently executing program does not access to the next program until the address range of the next program is set.

As has been described above, before the controlling is handed over from the system software such as the operating system to the program to be executed next such as an application program, it is possible to set the accessible address range. This ensures to avoid that the currently executing program affects the program to be executed next, thereby remarkably improving the reliability.

It is preferable that the 1-chip microcomputer is further provided with means for generating an interruption request signal to the CPU when the access permission setting register is set so as to prohibit an address other than the address range from being accessed and the judging means judges that the address other than the address range has been accessed, and a predetermined interruption proceeding program is executed.

In such a case, when a dishonest access is made by the other program, the judging means judges that such dishonest access has been made, and the interruption request signal generating means generates the interruption request signal that is sent to the CPU. Upon receipt of the interruption request signal, the CPU executes a predetermined interruption proceeding program. Accordingly, it can be avoided that the CPU goes out of order.

It is preferable in the 1-chip microcomputer that the interruption proceeding program is arranged so that the controlling (management) is handed over to a system program or an operating system. In this case, the interruption request signal generated by the interruption request signal generating means is sent to the CPU, the interruption proceeding program is executed. Thus, the 1-chip microcomputer becomes under the control of the system program or the operating system. Accordingly, it can be avoided that the CPU or the application program goes out of order.

It is preferable that the 1-chip microcomputer is further provided with re-execution forbidding information memory means for storing information indicating that an access is carried out beyond an access limit, and the control means controls the memory based on the information so that the access is not carried out again beyond the access limit.

In this case, when accessing to the memory beyond the access limit, the information indicative thereof is stored in the memory means (such as a flag and register). The control means controls the memory so that the access is not carried out again beyond the access limit. Thus, the program that has been dishonestly accessed is forbidden to be executed afterwards, thereby ensuring that the CPU continues the proceeding without going out of order.

It is preferable that the memory is a nonvolatile memory. In such a case, it is possible to execute the program that is later added or rewritten such as an application program without affecting the existing application programs.

It is preferable that the 1-chip microcomputer is used in an IC card. In this case, in an IC card in which a plurality of application programs are built in, it is possible to maintain the security among the application programs. It is also possible to realize an IC card in which a plurality of programs are stored and to dynamically exchange one with another without resetting the respective programs. Accordingly, it is possible to use such an IC card for multipurpose while the IC card is kept being loaded in reader and writer. In addition, since it is possible to prevent the programs and the data from interfering with each other, it is possible to maintain the security for such as the prohibition of dishonest access by a program and the protection of the data. Accordingly, the above-mentioned 1-chip microcomputers are suitable for use in an IC card in which confidential data such as the private information are stored.

There are described above novel features which the skilled man will appreciate give rise to advantages. These are each independent aspect of the invention to be covered by the present application, irrespective of whether or not they are included within the scope of the following claims.

What is claimed is:

1. A 1-chip microcomputer, comprising:
   register writing control means for determining whether a writing operation occurs from a predetermined address space or from an address space other than the predetermined address space, and outputting a writing reference signal when the writing operation occurs from the predetermined address space;
   access permission address range setting means for setting an address range within which access by an application program to be executed is permitted only when the writing reference signal is output, such that said access permission address range setting means is operable to set said address range only when a software in a predetermined address space is being executed;
   judging means for judging whether or not an access is carried out within the address range thus set during execution of the application program;
   access permission setting means for setting whether or not an access with respect to an address outside of the address range should be permitted, said access permission setting means being operable to set said access only when the software in the predetermined address space is being executed; and
   control means for controlling an access of the application program to a memory based on a result of the judging means and permission set by the access permission setting means.

2. A 1-chip microcomputer, comprising:
   a monitor flag for toggling a flag, indicating that a predetermined address space is being accessed, based on an address bus signal and an instruction read out signal indicative of a first cycle of an instruction;
   an access permission address range setting register operable to set, when said flag is toggled, an address range within which an access is permitted;
   judging means for judging whether or not an access is carried out within the address range thus set during execution of a software;
   an access permission setting register operable to set, when said flag is toggled, a permission for accessing outside the address range; and
   control means for controlling an access with respect to a memory based on a result of the judging means and permission set by the access permission setting register,
   wherein the access permission address range setting register and the access permission setting register are readable regardless of whether the flag is toggled or not.

3. The 1-chip microcomputer as set forth in claim 2, wherein:
   a system software is stored in the predetermined address space, and
   the system software sets (a) the access permission address range setting register so as to have an address range in which a next program to be executed is stored prior to execution of the next program and (b) the access permission register so as not to permit the access with respect to the address other than the address range.

4. The 1-chip microcomputer as set forth in claim 2, further comprising:
   interruption request signal generating means for generating an interruption request signal to a CPU when the access permission setting register is set so as not to permit access to the address other than the address range and the judging means judges that the address other than the address range has been accessed, in which a predetermined interruption proceeding program is executed.

5. The 1-chip microcomputer as set forth in claim 3, further comprising:
   interruption request signal generating means for generating an interruption request signal to a CPU when the access permission setting register is set so as not to permit access to the address other than the address range and the judging means judges that the address other than the address range has been accessed, in which a predetermined interruption proceeding program is executed.

6. The 1-chip microcomputer as set forth in claim 4, wherein the interruption proceeding program hands over control to one of a system program and an operating system.

7. The 1-chip microcomputer as set forth in claim 5, wherein the interruption proceeding program hands over control to one of a system program and an operating system.

8. The 1-chip microcomputer as set forth in claim 3, further comprising:
   re-execution forbidding information memory means for storing information indicating that an access is carried out beyond an access limit,
   wherein the control means controls the memory based on the information, such that the access is not carried out again beyond the access limit.

9. The 1-chip microcomputer as set forth in claim 1, wherein the memory is a nonvolatile memory that is rewritable.

10. The 1-chip microcomputer as set forth in claim 2, wherein the memory is a nonvolatile memory that is rewritable.

11. The 1-chip microcomputer as set forth in claim 3, wherein the memory is a nonvolatile memory that is rewritable.

12. The 1-chip microcomputer as set forth in claim 4, wherein the memory is a nonvolatile memory that is rewritable.

13. The 1-chip microcomputer as set forth in claim 5, wherein the memory is a nonvolatile memory that is rewritable.

14. The 1-chip microcomputer as set forth in claim 6, wherein the memory is a nonvolatile memory that is rewritable.

15. The 1-chip microcomputer as set forth in claim 7, wherein the memory is a nonvolatile memory that is rewritable.

16. The 1-chip microcomputer as set forth in claim 8, wherein the memory is a nonvolatile memory that is rewritable.

17. An IC card that uses a 1-chip microcomputer, said 1-chip microcomputer comprising:
   register writing control means for determining whether a writing operation occurs from a predetermined address space or from an address space other than the predetermined address space, and outputting a writing reference signal when the writing operation occurs from the predetermined address space;
   access permission address range setting means for setting an address range within which access by an application program to be executed is permitted only when the writing reference signal is output, such that said access permission address range setting means is operable to set said address range only when a software in a predetermined address space is being executed;

judging means for judging whether or not an access is carried out within the address range thus set during execution of the application program;

access permission setting means for setting whether or not an access with respect to an address outside of the address range should be permitted, said access permission setting means being operable to set said access only when the software in the predetermined address space is being executed; and control means for controlling an access of the application program to a memory based on a result of the judging means and permission set by the access permission setting means.

18. An IC card that uses a 1-chip microcomputer, said 1-chip microcomputer comprising:

a monitor flag for toggling a flag, indicating that a predetermined address space is being accessed, based on an address bus signal and an instruction read out signal indicative of a first cycle of an instruction;

an access permission address range setting register operable to set, when said flag is toggled, an address range within which an access is permitted;

judging means for judging whether or not an access is carried out within the address range thus set during execution of a software;

an access permission setting register operable to set, when said flag is toggled, a permission for accessing an address outside the address range; and control means for controlling an access with respect to a memory based on a result of the judging means and permission set by the access permission setting register, wherein the access permission address range setting register and the access permission setting register are readable regardless of whether the flag is toggled or not.

19. The IC card as set forth in claim 18, wherein:

a system software is stored in the predetermined address space, and the system software sets (a) the access permission address range setting register so as to have an address range in which a next program to be executed is stored prior to execution of the next program and (b) the access permission register so as not to permit the access with respect to the address other than the address range.

20. The IC card as set forth in claim 19, further comprising:

interruption request signal generating means for generating an interruption request signal to a CPU when the access permission setting register is set so as not to permit access to the address other than the address range and the judging means judges that the address other than the address range has been accessed, in which a predetermined interruption proceeding program is executed.

21. The IC card as set forth in claim 20, wherein the interruption proceeding program hands over control to one of a system program and an operating system.

22. The IC card as set forth in claim 19, further comprising:

re-execution forbidding information memory means for storing information indicating that an access is carried out beyond an access limit, wherein the control means controls the memory based on the information such that the access is not carried out again beyond the access limit.

23. The 1-chip microcomputer of claim 2, wherein while said flag indicates that the predetermined address space is not being accessed, each of said access permission address range setting register and said access permission setting register are not set.

24. The IC card set forth in claim 18, wherein while said flag indicates that the predetermined address space is not being accessed, each of said access permission address range setting register and said access permission setting register are not set.

25. The 1-chip microcomputer as set forth in claim 1, wherein the address range set by the access permission address range setting means is readable regardless of whether or not the writing reference signal is output, and the access set by said access permission setting means is readable regardless of whether or not the software in the predetermined address space is being executed.

26. The IC card as set forth in claim 17, wherein the address range set by the access permission address range setting means is readable regardless of whether or not the writing reference signal is output, and the access set by said access permission setting means is readable regardless of whether or not the software in the predetermined address space is being executed.

* * * * *